(12) United States Patent
Kin

(10) Patent No.: US 11,384,574 B2
(45) Date of Patent: Jul. 12, 2022

(54) VEHICLE HANDLE DEVICE

(71) Applicant: ALPHA CORPORATION, Kanagawa (JP)

(72) Inventor: Lan Kin, Yokohama (JP)

(73) Assignee: ALPHA CORPORATION, Kanagawa (JP)

(*) Notice: Subject to any disclaimer, the term of this patent is extended or adjusted under 35 U.S.C. 154(b) by 257 days.

(21) Appl. No.: 16/685,111

(22) Filed: Nov. 15, 2019

(65) Prior Publication Data

US 2020/0080352 A1 Mar. 12, 2020

Related U.S. Application Data

(63) Continuation of application No. PCT/JP2018/019877, filed on May 23, 2018.

(30) Foreign Application Priority Data

May 23, 2017 (JP) .............................. JP2017-101445

(51) Int. Cl.
*E05B 85/02* (2014.01)
*E05B 85/12* (2014.01)
(Continued)

(52) U.S. Cl.
CPC .............. *E05B 85/13* (2013.01); *E05B 79/20* (2013.01); *E05B 79/22* (2013.01); *E05B 85/02* (2013.01)

(58) Field of Classification Search
CPC ............. E05B 17/0066; E05B 17/0062; E05B 17/0054; E05B 15/1635; E05B 2015/1664;
(Continued)

(56) References Cited

U.S. PATENT DOCUMENTS 5,653,411 A 8/1997 Picco et al.
6,418,672 B1* 7/2002 Hampel ................ E04H 1/1216
52/79.5
(Continued)

FOREIGN PATENT DOCUMENTS

CN 1572558 A 2/2005
CN 1631740 A 6/2005
(Continued)

OTHER PUBLICATIONS

Written Opinion issued in PCT/JP2018/019877; dated Jul. 31, 2018.
(Continued)

*Primary Examiner* — Kristina R Fulton
*Assistant Examiner* — Noah Horowitz
(74) *Attorney, Agent, or Firm* — Studebaker & Brackett PC

(57) ABSTRACT

A vehicle handle device configured to operate a door lock device via a cable device, the vehicle handle device includes an operation member connected to the cable device and a handle case housing the operation member. The handle case includes a cable fixing base in which the cable device is arranged, a cap portion configured to fix the cable device to the cable fixing base, and a hinge portion configured to engage an engaging piece provided on one of the cable fixing base and the cap portion with an engaged piece provided in another of the cable fixing base and the cap portion, and rotatably connect the cap portion to the cable fixing base.

4 Claims, 6 Drawing Sheets

(51) Int. Cl.
*E05B 79/20* (2014.01)
*E05B 79/22* (2014.01)

(58) Field of Classification Search
CPC ......... E05B 2015/1657; E05B 17/0004; E05B 17/0012; E05B 79/20; E05B 79/22; E05B 85/12; E05B 53/005; E05B 85/13; E05B 85/02; Y10S 292/38; Y10S 292/53; Y10T 292/57; Y10T 74/2045; Y10T 74/20462; F16C 1/10
See application file for complete search history.

(56) References Cited

U.S. PATENT DOCUMENTS

| | | | | |
|---|---|---|---|---|
| 7,062,823 | B2* | 6/2006 | Copen | E05B 73/0017 |
| | | | | 24/704.1 |
| 8,864,193 | B2* | 10/2014 | Mori | E05B 79/20 |
| | | | | 292/336.3 |
| 10,270,309 | B2* | 4/2019 | Nishio | E05B 79/02 |
| 10,323,680 | B2* | 6/2019 | Carabalona | F16C 1/223 |
| 2004/0244145 | A1 | 12/2004 | Anscher | |
| 2004/0244149 | A1 | 12/2004 | Anscher | |
| 2005/0210631 | A1 | 9/2005 | Anscher | |
| 2013/0038074 | A1 | 2/2013 | Mori et al. | |
| 2014/0076094 | A1 | 3/2014 | Mori et al. | |
| 2015/0247347 | A1 | 9/2015 | Suzumura et al. | |
| 2017/0234039 | A1* | 8/2017 | Taga | E05B 79/04 |
| | | | | 292/337 |
| 2020/0080347 | A1* | 3/2020 | Kin | E05B 7/00 |
| 2021/0087860 | A1* | 3/2021 | Kin | E05B 85/12 |
| 2021/0156179 | A1* | 5/2021 | Savant | B60J 5/0468 |
| 2021/0172207 | A1* | 6/2021 | Savant | E05B 85/18 |

FOREIGN PATENT DOCUMENTS

| | | |
|---|---|---|
| CN | 1830730 A | 9/2006 |
| EP | 0671580 A1 | 9/1995 |
| ES | 2 137 794 A1 | 12/1999 |
| JP | S58062266 A | 4/1983 |
| JP | H08035465 A | 2/1996 |
| JP | 2014062441 A | 4/2014 |
| WO | 2015/019895 A1 | 2/2015 |
| WO | 2016/038754 A1 | 3/2016 |

OTHER PUBLICATIONS

An Office Action mailed by China National Intellectual Property Administration dated Apr. 15, 2021, which corresponds to Chinese Patent Application No. 201880033343.4 and is related to U.S. Appl. No. 16/685,111; with English language translation.
An Office Action issued by the State Intellectual Property Office of the People's Republic of China dated Sep. 9, 2020, which corresponds to Chinese Patent Application No. CN 201880033343.4.
The extended European search report issued by the European Patent Office dated Feb. 4, 2021, which corresponds to European Patent Application No. 1885823.4-1005 and is related to U.S. Appl. No. 16/685,111.
International Search Report issued in PCT/JP2018/019877; dated Jul. 31, 2018.

* cited by examiner

VEHICLE HANDLE DEVICE

CROSS REFERENCE TO RELATED APPLICATIONS

This application is a continuation of PCT application No. PCT/JP18/019877, which was filed on May 23, 2018 based on Japanese Patent Application No. 2017-101445 filed on May 23, 2017, the contents of which are incorporated herein by reference.

TECHNICAL FIELD

The present invention relates to a vehicle handle device.

BACKGROUND ART

In the related art, a handle device for performing an opening operation of a door of a vehicle is known. The handle device is provided, for example, on a side door. The side door is provided with a door lock device that is engaged with a vehicle body and holds the side door in a closed state, and the door lock device and the handle device are connected via a cable device. The cable device includes an inner cable and a hollow outer cable, and the inner cable is inserted into the outer cable. When the handle device is operated, an operating force of an operator is applied through the inner cable of the cable device, and the door lock device is operated accordingly.

In addition to a handle operated by the operator, the handle device includes a handle case that houses the handle. The handle case includes a cable fixing base on which an outer cable of the cable device is arranged, a cap portion that fixes the outer cable to the cable fixing base, and a thin plate shaped hinge portion that rotates the cap portion with respect to the cable fixing base. The handle case is manufactured as an integrally molded product that is obtained by linearly connecting the cable fixing base with the cap portion with the hinge portion therebetween, and is shipped to a vehicle manufacturing process as a part of the components constituting the handle device.

In the vehicle manufacturing process, the outer cable of the cable device is fixed to the cable fixing base. Specifically, first, an end portion of the outer cable is arranged on the cable fixing base. Next, the cap portion is rotated around the hinge portion, and the cap portion is opposed to the cable fixing base. Accordingly, the outer cable is clamped between the cable fixing base and the hinge portion, and is fixed to the cable fixing base.

For example, Patent Literature 1 discloses a vehicle door lock device as a structure for fixing a cable device. In the vehicle door lock device, one end portion of an outer tube of an operation cable is fixed to a housing and a cover. The cover is constructed separately from the housing, and is assembled to the housing so as to be attachable to and detachable from the housing and rotatable between an open state and a closed state. Further, in Patent Literature 1, the housing and the cover are provided with a temporary retaining means. The temporary fixing means is for temporarily holding the cover in an open state with respect to the housing in a state where the cover is rotatably assembled to the housing.

CITATION LIST

Patent Literature

[Patent Literature 1] JP-A-2014-062441

However, when a thin plate-shaped hinge portion is realized in an integrally molded product, if the thickness of the hinge portion increases, the hinge portion may be distorted and cracked when the cap portion is rotated. On the other hand, when the thickness of the hinge portion is set to be thin, a short shot may occur at the time of molding, and a crack may occur.

SUMMARY OF INVENTION

According to an embodiment of the present invention, a vehicle handle device is excellent in workability at the time of fixing a cable device while having a structure excellent in moldability.

According to an embodiment of the present invention, a vehicle handle device configured to operate a door lock device via a cable device, the vehicle handle device includes an operation member connected to the cable device, and a handle case housing the operation member. The handle case includes a cable fixing base in which the cable device is arranged, a cap portion configured to fix the cable device to the cable fixing base, and a hinge portion configured to engage an engaging piece provided on one of the cable fixing base and the cap portion with an engaged piece provided in another of the cable fixing base and the cap portion, and rotatably connect the cap portion to the cable fixing base. The cable fixing base and the cap portion may be integrally molded via a connecting piece, in the handle case. The engaged piece and the engaging piece may face with each other. The connecting piece includes a breaking portion configured to be broken when an external force is applied to the cap portion.

According to the embodiment of the present invention, the breaking portion may be configured to be broken and the engaged piece and the engaging piece are configured to be engaged, when a pushing force pushing the cap portion toward the cable fixing base side such that the engaged piece and the engaging piece are engaged.

According to the embodiment of the present invention, the engaged piece and the engaging piece may include a protrusion portion provided on one of the engaged piece and the engaging piece and protruding outward, and a protrusion receiving portion provided on another of the engaged piece and the engaging piece, corresponding to the protrusion portion, and being concave. The protrusion portion and the protrusion receiving portion may be configured to be engaged with each other in a state that the engaged piece is engaged with the engaging piece by the pushing force, and may hold the posture of the cap portion with respect to the cable fixing base.

According to the embodiment of the present invention, the protrusion portion and the protrusion receiving portion may be configured to be disengaged by applying a rotating force around the hinge portion to the cap portion. The cap portion may be configured to be rotated to a fixing position at which the cable device is clamped and fixed between the cap portion and the cable fixing base, when the protrusion portion and the protrusion receiving portion are disengaged.

According to the embodiment of the present invention, the connecting piece may connect the engaged piece with the engaging piece.

ADVANTAGEOUS EFFECTS OF INVENTION

According to the embodiment of the present invention, it is possible to provide the vehicle handle device excellent in workability at the time of fixing the cable device while having a structure excellent in moldability.

DESCRIPTION OF EMBODIMENTS

Figure 1:
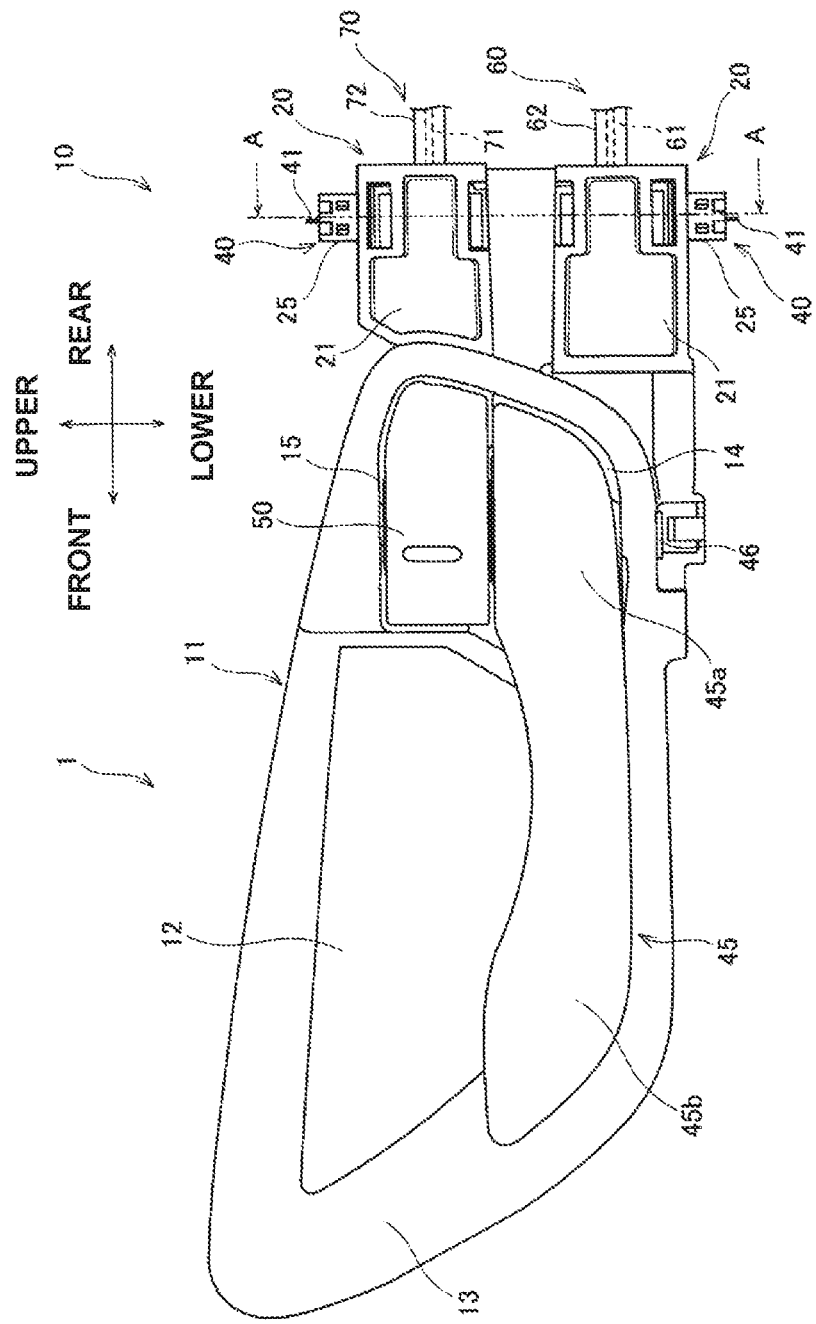
FIG. 1 is a front view schematically showing an inside door handle device.
Figure 2:
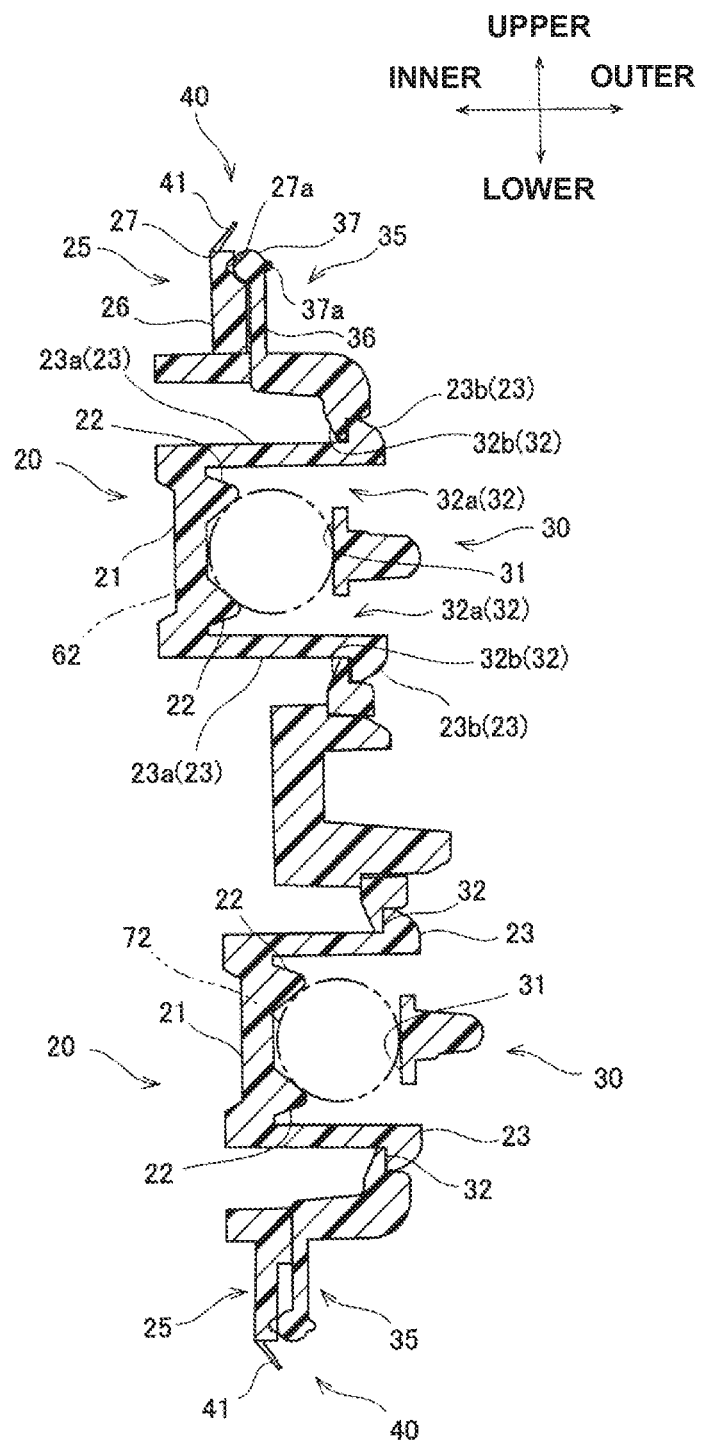
FIG. 2 is a cross-sectional view of the inside door handle device shown in FIG. 1 taken along a line A-A.

Hereinafter, an inside door handle device 1 according to the present embodiment will be described as being applied to a side door of a vehicle. Here, FIG. 1 is a front view schematically showing the inside door handle device 1 according to the present embodiment. FIG. 2 is a cross-sectional view of the inside door handle device 1 shown in FIG. 1 taken along a line A-A.

The inside door handle device 1 is a vehicle handle device for performing an opening operation of a side door of the vehicle from a vehicle interior side. The inside door handle device 1 is disposed in a door trim, that is an interior member, that covers the inside (vehicle interior side) of the side door, and is fixed to a required position of a door inner panel that constitutes the side door. The side door is provided with a door lock device (not shown) that includes a latch portion that is engaged with a vehicle body and holds the side door in a closed state, and cable devices 60, 70 that connect the door lock device with the inside door handle device 1.

The inside door handle device 1 mainly includes a handle case 10, a handle 45, and a lock knob 50.

The handle case 10 is arranged in an opening provided in the door trim and faces the vehicle interior side so as to be formed integrally with the door trim.

The handle case 10 includes a case body 11 and a cable holding portion 20.

The case body 11 is a member that houses the handle 45 and the lock knob 50 and forms a space required for gripping the handle 45. The case body 11 includes a flat plate-shaped vertical wall portion 12 and a peripheral wall portion 13 connected to a peripheral edge of the vertical wall portion 12. A cross section of the case body 11 along an upper-lower direction is formed in a substantially U shape having the vertical wall portion 12 as a bottom portion.

A handle holding portion 14 holding the handle 45 and a lock knob holding portion 15 holding the lock knob 50 are formed on a vehicle rear side of the vertical wall portion 12.

The handle holding portion 14 is set at a lower position in the case body 11, and the lock knob holding portion 15 is set at an upper position of the handle holding portion 14 in the handle case 10. In the case body 11, the handle 45 and the lock knob 50 are disposed in the upper-lower direction.

The peripheral wall portion 13 has a flange shape extending toward the vehicle interior side from a connecting portion with the vertical wall portion 12 as a base point. The shape of a tip end side of the peripheral wall portion 13 is set along a peripheral shape of the opening of the door trim, and is designed to be integrated with the door trim.

The cable holding portion 20 is disposed on a vehicle rear side of the case body 11. The cable holding portion 20 has a function of fixing a cable device (hereinafter, referred to as "first cable device" as necessary) 60 connected to the handle 45, and a cable device (hereinafter, referred to as "second cable device" as necessary) 70 connected to the lock knob 50. In a state in which the handle case 10 is disposed on the door trim, the cable holding portion 20 is located on a back side of the door trim and is hidden by the door trim. A structure of the cable holding portion 20 will be described in detail below.

The handle 45 is an operation member that is operated by an operator to open the side door. The handle 45 is disposed in a lower part in the handle case 10. The handle 45 includes a base portion 45a housed in the handle holding portion 14, and an operation portion 45b extending forward of the vehicle from the base portion 45a and held by the operator. A pin 46 penetrating the base portion 45a is disposed in the handle holding portion 14 along the upper-lower direction. The handle 45 is pivotally supported by a pin 46 in a rotatable manner. The handle 45 rotates in a range between a closed position at which the handle 45 is housed in the case body 11 and an open position at which the handle 45 is rotated to a predetermined position in the vehicle interior side.

The first cable device 60 is a connecting member that connects the handle 45 with the door lock device, in which one end portion thereof is connected to the handle 45, and another end portion thereof is connected to the door lock device. The first cable device 60 includes an inner cable 61 and a tubular outer cable 62. The inner cable 61 is inserted into a hollow of the outer cable 62 and can move inside thereof.

One end portion of the outer cable 62 is fixed to the cable holding portion 20 of the handle case 10, and another end portion thereof is fixed to the door lock device. That is, the outer cable 62 is held in a fixed state between the inside door handle device 1 and the door lock device. One end portion of the inner cable 61 is connected to the base portion 45a of the handle 45, and another end portion thereof is connected to a movable point that operates the latch portion of the door lock device.

When the handle 45 is in the closed position, the base portion 45a of the handle 45 is housed in the handle holding portion 14. In this case, the latch portion of the door lock device is engaged with the vehicle body, and the side door is maintained in the closed state. On the other hand, when the handle 45 is rotated from the closed position to the open position, the inner cable 61 connected to the base portion 45a is pulled. Accordingly, the movable point of the door lock device connected to the other end of the inner cable 61 is operated, and the engagement state between the latch portion and the vehicle body is released. In this way, when the operator operates the handle 45 to input an operating force to the first cable device 60, the door lock device is operated to open the side door.

The lock knob 50 is an operation member that is operated by the operator to restrict opening of the side door. The lock knob 50 is disposed in an upper part in the handle case 10. A first boss portion protruding downward is provided on an upper end side of the lock knob holding portion 15. A second boss portion protruding upward is provided on a lower end side of the lock knob holding portion 15 at a position facing the first boss portion. The lock knob 50 is rotatably supported by the first boss portion and the second boss portion. The lock knob 50 rotates in a range between a closed position at which the lock knob 50 is housed in the case body 11 and an open position at which the lock knob 50 is rotated to a predetermined position on the vehicle interior side.

The second cable device 70 is a connecting member that connects the lock knob 50 with the door lock device, in which one end portion thereof is connected to the lock knob 50, and another end portion thereof is connected to the door lock device. The second cable device 70 includes an inner cable 71 and a tubular outer cable 72. The inner cable 71 is inserted into a hollow of the outer cable 72 and can move inside thereof.

One end portion of the outer cable 72 is fixed to the cable holding portion 20 of the handle case 10, and another end portion thereof is fixed to the door lock device. That is, the outer cable 72 is held in a fixed state between the inside door handle device 1 and the door lock device. One end portion of the inner cable 71 is connected to the lock knob 50, and another end portion thereof is connected to the door lock device.

When the lock knob 50 is in the closed position, the lock knob 50 is housed in the handle holding portion 14. In this case, the door lock device comes into an unlocked state in which an input of the operating force applied to the movable point by the first cable device 60 is enabled. Therefore, it is possible to freely open the side door by the operation of the handle 45. On the other hand, when the lock knob 50 is rotated from the closed position to the open position, the inner cable 71 connected to the lock knob 50 is pulled. Accordingly, the door lock device connected to the other end portion of the inner cable 71 is operated, and comes into a locked state in which the input of the operating force applied to the movable point by the first cable device 60 is disabled. In the locked state, since the operation of the door lock device by the handle 45 is canceled, the opening of the side door is restricted. In this way, by the operator operating the lock knob 50 and inputting the operating force to the second cable device 70, the door lock device is operated and the opening operation of the side door can be restricted.

Hereinafter, a fixing structure of the cable devices 60, 70 included in the handle case 10, which is one of the features of the present embodiment, will be described. The cable device 60, 70 are fixed to the handle case 10 by the cable holding portion 20. The cable holding portions 20 fix the outer cables 62, 72 of the cable devices 60, 70, and are provided corresponding to the two pairs of cable devices 60, 70, respectively.

The cable holding portion 20 includes a cable fixing base 21 and a cap portion 30. The cable fixing base 21 and the cap portion 30 face each other with a predetermined interval therebetween. Each of the outer cables 62, 72 is clamped between the cable fixing base 21 located at a vehicle inner side and the cap portion 30 located at a vehicle outer side, and is thereby fixed.

The cable fixing base 21 has a substantially flat plate shape. In order to reduce the weight of the cable fixing base 21, a thinned region and a lightening region are set at appropriate positions.

A pair of protrusions 22 protruding toward the cap portion 30 is provided on the cable fixing base 21 along the outer cables 62, 72. The pair of protrusions 22 are disposed in parallel at predetermined intervals and located on both sides of the outer cables 62, 72 with the outer cables 62, 72 being arranged on the cable fixing base 21. The pair of protrusions 22 has a function of locating the outer cables 62, 72 and preventing positional deviation of the outer cables 62, 72.

Further, the cable fixing base 21 is provided with a claw portion 23 for fixing the cap portion 30. The claw portion 23 includes a pillar portion 23a standing from the cable fixing base 21 to the cap portion 30 side, and an engaging claw 23b located at a tip end of the pillar portion 23a. The claw portion 23 is engaged with claw receiving portions 32 provided in the cap portion 30 to fix the cap portion 30 in a state in which each of the outer cables 62, is clamped. In this embodiment, two sets of claw portions 23 are prepared and are disposed facing each other with a predetermined interval so as to clamp the pair of protrusions 22 therebetween.

The cap portion 30 is a member that fixes each of the outer cable 62, 72 to the cable fixing base 21. The cap portion 30 has a substantially flat plate shape. The cap portion 30 is provided with a clamping portion 31 that clamps each of the outer cables 62, 72 with the cable fixing base 21. When each of the outer cables 62, 72 is clamped between the clamping portion 31 and the cable fixing base 21, the clamping portion 31 abuts against the outer surface of each of the outer cables 62, 72.

Further, in the cap portion 30, the claw receiving portions 32 for engaging with the claw portion 23 are provided on both sides of the clamping portion 31. The claw receiving portion 32 includes an opening 32a through which the engaging claw 23b on a tip end side of the claw portion 23 is inserted, and an engaging portion 32b engaged with the engaging claw 23b which has passed through an opening 32a.

The cable holding portion 20 further includes a hinge portion 40 that rotatably connects the cap portion 30 to the cable fixing base 21. By the hinge portion 40, the cap portion 30 can be rotated between a fixing position at which the cap portion 30 faces the cable fixing base 21 and each of the outer cables 62, 72 is clamped between the cable fixing base 21 and the cap portion 30 and an open position at which the cap portion 30 is open at a constant opening angle with respect to the cable fixing base 21. In the present embodiment, the open position is set to an opening angle (for example, about 180°) in which the cable fixing base 21 and the cap portion 30 form a straight line shape via the hinge portion 40.

The hinge portion 40 includes a first hinge piece 25 provided on the cable fixing base 21 and a second hinge piece 35 provided on the cap portion 30. The hinge portion 40 has a link structure that bends around an engagement point formed by engaging the first hinge piece 25 and the second hinge piece 35 with each other.

Figure 3:
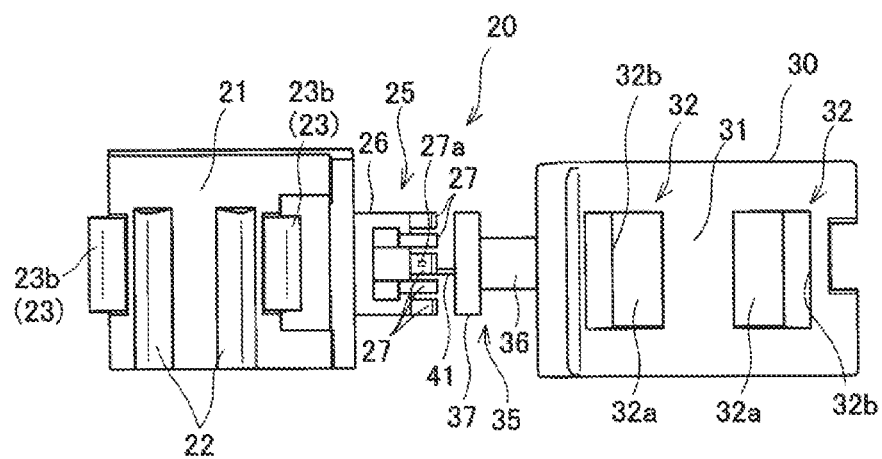
FIG. 3 is a front view of a cable holding portion manufactured as an integrally molded product.
Figure 4:
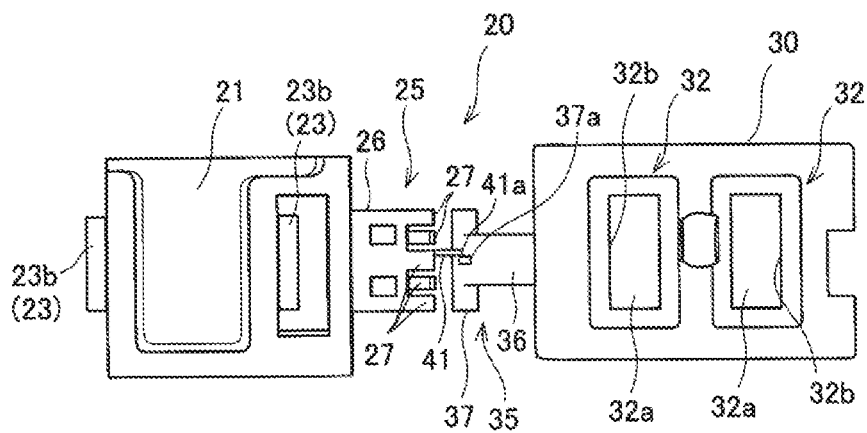
FIG. 4 is a side view of the cable holding portion shown in FIG. 3.
Figure 5:
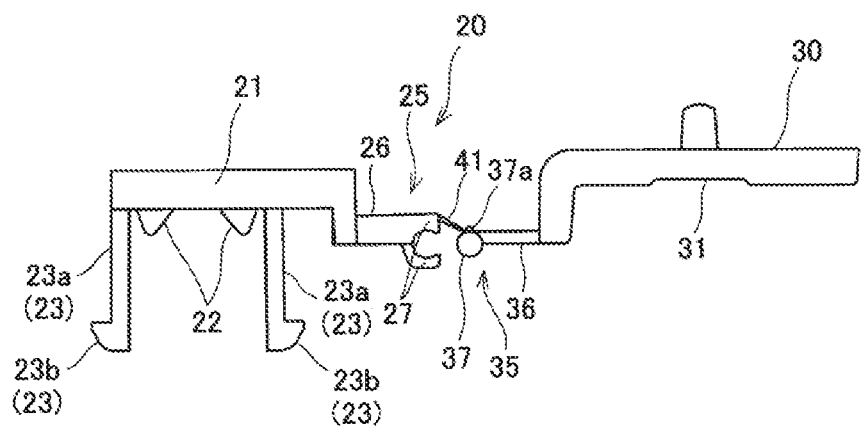
FIG. 5 is a back view of the cable holding portion shown in FIG. 3.

The first hinge piece 25 includes an extension portion 26 extending from the cable fixing base 21 and a plurality of bearing arms 27 provided at a tip end of the extension portion 26 (see also FIGS. 3 to 5 described below). The plurality of bearing arms 27 are engaging pieces that engage with a rotation shaft 37 of the second hinge piece 35 described below. The plurality of bearing arms 27 have a function of pivotably supporting the rotation shaft 37 in a rotatable manner. The plurality of bearing arms 27 are disposed at a predetermined pitch along a front-rear direction of the vehicle. The bearing arms 27 each have an arc shape that circumscribes the rotation shaft 37, and the circumscribed positions are alternately disposed so as to alternate between the vehicle inner side and the vehicle outer side. The front end side of the bearing arm 27 is opened to mount the rotary shaft 37.

The second hinge piece 35 includes an extension portion 36 extending from the cap portion 30 and the rotation shaft 37 provided orthogonal to a tip end of the extension portion 36 (see also FIGS. 3 to 5 described below). The rotation shaft 37 is an engaged piece that is engaged with the plurality of bearing arms 27 serving as engaging pieces. The rotation shaft 37 is mounted (engaged) with respect to the bearing arm 27 from an open side of the plurality of bearing arms 27, and the bearing arms 27 circumscribe around the rotation shaft 37, so that the rotation shaft 37 is pivotally supported. When the rotation shaft 37 is pivotally supported by the plurality of bearing arms 27, the first hinge piece 25 and the second hinge piece 35 are engaged with each other.

The hinge portion 40 is provided with a structure for holding the posture of the cap portion 30 with respect to the cable fixing base 21 in an open state. Specifically, the rotation shaft 37 of the second hinge piece 35 is provided with a protrusion portion 37a protruding outward. On the other hand, the bearing arm 27 of the first hinge piece 25 is provided with a concave protrusion receiving portion 27a corresponding to the protrusion portion 37a. The protrusion receiving portion 27a is set to any one of the bearing arms 27 of the plurality of bearing arms 27. When the protrusion portion 37a and the protrusion receiving portion 27a are engaged with each other, an engagement force between the protrusion portion 37a and the protrusion receiving portion 27a restricts the rotation of the cap portion 30. Accordingly, the posture of the cap portion 30 is held in the open state.

The engagement force between the protrusion portion 37a and the protrusion receiving portion 27a can be set according to the size and the number of protrusions 37a and the protrusion receiving portions 27a. However, as will be described below, the protrusion portion 37a and the protrusion receiving portion 27a are disengaged by applying a rotating force to the cap portion 30. Therefore, these settings can be set in consideration of operability associated with the disengagement between the protrusion portion 37a and the protrusion receiving portion 27a and stability of holding the posture of the cap portion 30.

Figure 6A:
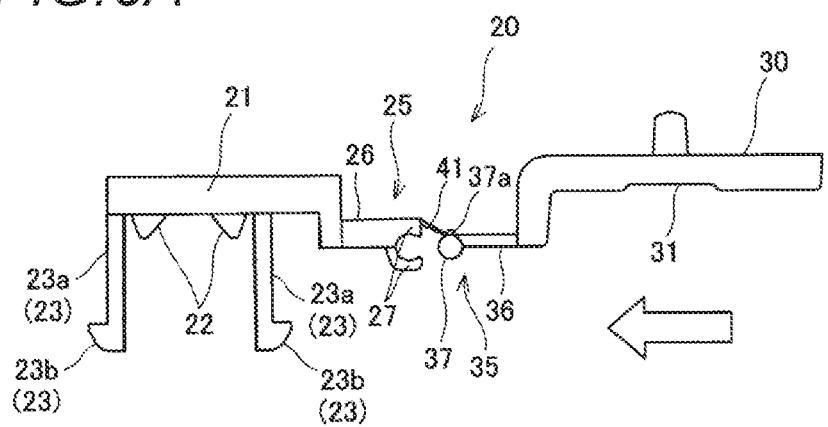
FIGS. 6A and 6B are illustrative diagrams showing an assembly process of a hinge portion.
Figure 6B:
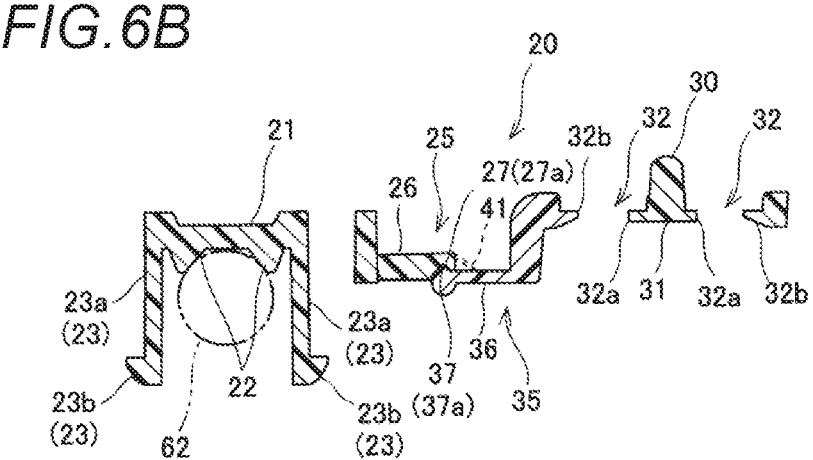

As one of the features of the present embodiment, the handle case 10 is formed of an integrally molded product which is integrally formed by molding using a required resin. Hereinafter, a structure of the cable holding portion 20 forming a part of the handle case 10 will be described. Here, FIG. 3 is a front view of the cable holding portion 20 manufactured as an integrally molded product. FIG. 4 is a side view showing the cable holding portion 20 shown in FIG. 3, and FIG. 5 is a rear view showing the cable holding portion 20 shown in FIG. 3. FIGS. 6A and 6B are illustrative diagrams showing an assembly process of the hinge portion 40.

In the cable holding portion 20 obtained by molding, the plurality of arms 27 of the first hinge piece 25 and the rotation shaft 37 of the second hinge pieces 35 are not engaged with each other, and the rotation shaft 37 and the plurality of bearing arms 27 face each other with a predetermined distance therebetween. Here, a posture in which the rotation shaft 37 faces the plurality of bearing arms 27 refers to a posture in which the rotation shaft 37 can be engaged with the plurality of bearing arms 27, and preferably a posture in which the rotation shaft 37 facing the plurality of bearing arms 27 can be engaged with the plurality of bearing arms 27 by a pushing force in a predetermined direction.

A connecting piece 41 is provided between the first hinge piece 25 and the second hinge piece 35. That is, the cable holding portion 20 is formed of the integrally molded product obtained by integrally molding the cable fixing base 21 and the cap portion 30 via a connecting piece 41 that connects the first hinge piece 25 with the second hinge piece 35. The cable fixing base 21 and the cap portion 30 are linearly laid out so as to face each other with the connecting piece 41 therebetween.

The connecting piece 41 is a solid rod-shaped connecting member. One end of the connecting piece 41 is connected to the bearing arm 27 located at the center of the plurality of bearing arms 27 of the first hinge piece 25, and the other end thereof is connected to the rotation shaft 37 of the second hinge piece 35. The connecting piece 41 is set at a position where the connecting piece 41 does not buffer during an assembly work of the hinge portion 40.

The connecting piece 41 has a tapered shape of which the cross-sectional area decreases from the bearing arm 27 to the rotation shaft 37. Therefore, a connecting portion of the connecting piece 41 that is connected to the rotation shaft 37 has a smallest cross-sectional area, and functions as a breaking portion 41a that is broken when an external force is applied to the cap portion 30.

When the handle case 10 (cable holding portion 20) is manufactured as the integrally molded product, the assembly work of the hinge portion 40 is performed before being shipped to a vehicle manufacturing process. In the assembling operation, a pushing force (external force) is applied to the cap portion 30 toward the cable fixing base 21 side such that the first hinge piece 25 and the second hinge piece 35 are brought close to each other, that is, the rotation shaft 37 is engaged with the plurality of bearing arms 27. The pushing force is applied in a constant direction along an arrangement direction of the cable fixing base 21 and the cap portion 30. When the pushing force is received, the connecting piece 41 is broken at the breaking portion 41a. Upon receiving the pushing force, the cap portion 30 moves toward the cable holding portion 20. Accordingly, the rotation shaft 37 of the second hinge piece 35 also moves toward the bearing arm 27 side of the first hinge piece 25 facing the rotation shaft 37. Then, the rotation shaft 37 enters from the open side of the plurality of bearing arms 27 to the inside thereof, and is engaged with (mounted on) the plurality of bearing arms 27. As a result, the rotation shaft 37 is pivotally supported by the plurality of bearing arms 27.

When the rotary shaft 37 is engaged with the plurality of bearing arms 27, the protrusion portion 37a and the protrusion receiving portion 27a are engaged with each other. When the protrusion portion 37a is engaged with the protrusion receiving portion 27a, the posture of the cap portion 30 is held in the open state. Therefore, when the assembling work of the hinge portion 40 is completed, the handle case 10 is completed in a state in which the posture of the cap portion 30 is held. The handle case 10 is shipped to the vehicle manufacturing process as a part of the components configuring the inside door handle device 1.

Figure 7A:
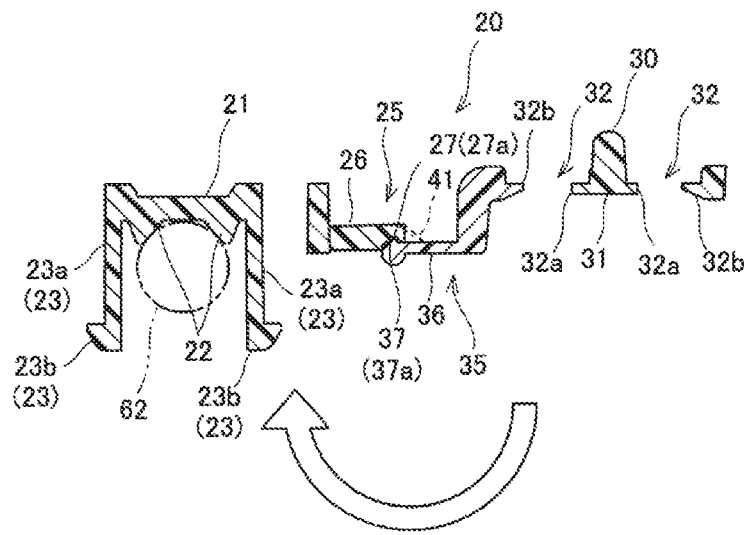
FIGS. 7A and 7B are illustrative diagrams showing a process of fixing a cable device to the cable holding portion.
Figure 7B:
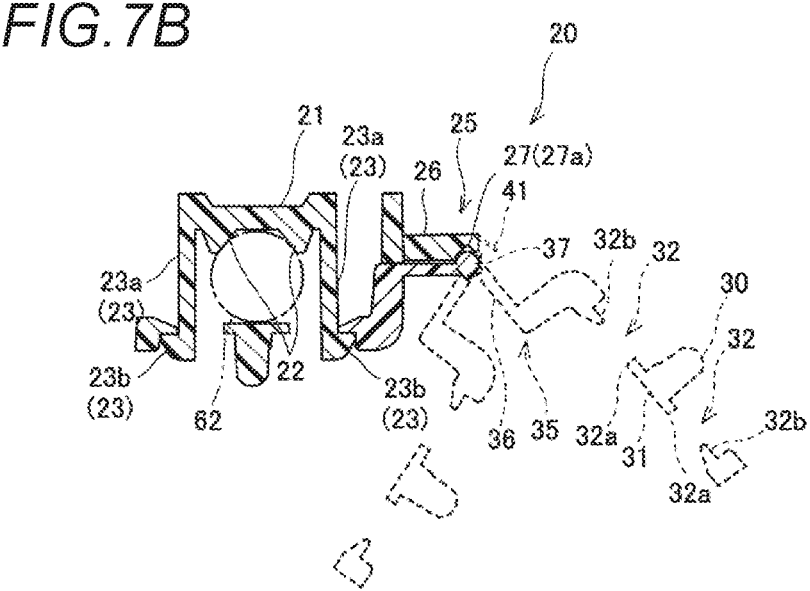

Next, a method of fixing the cable devices 60, 70 to the cable holding portions 20 in the vehicle manufacturing process will be described. Hereinafter, the first cable device 60 will be described as an example, but the same applies to the second cable device 70. FIGS. 7A and 7B are illustrative diagrams showing a process of fixing the cable device 60 to the cable holding portion 20.

First, the end portion of the outer cable 62 of the cable device 60 is disposed onto the cable fixing base 21. At this time, the end portion of the outer cable 62 is arranged onto the cable fixing base 21 so as to be clamped between the pair of protrusions 22.

Next, the rotating force is applied to the cap portion 30 so as to bend the hinge portion 40 around the engagement point between the first hinge piece 25 and the second hinge piece 35, that is, around the rotation shaft 37. A force in the rotational direction is applied to the rotation shaft 37 by the rotating force. When a predetermined value or more of the rotating force is applied to the cap portion 30, the rotation shaft 37 is rotated while the protrusion portion 37*a* is crushed. When the protrusion portion 37*a* is crushed, the protrusion portion 37*a* and the protrusion receiving portion 27*a* are disengaged. As a result, the rotation shaft 37 is rotatable, that is, the rotation of the cap portion 30 becomes possible.

When the cap portion 30 is rotatable, the hinge portion 40 is bent to approximately 180°, and the cap portion 30 is allowed to reach the fixing position. In the process of the cap portion 30 reaching the fixing position, the claw portion 23 of the cable fixing base 21 enters the opening 32*a* of the claw receiving portion 32 provided on the cap portion 30 side. In addition, the clamping portion 31 of the cap portion 30 abuts against the outer cable 62. When the cap portion 30 is further rotated, the clamping portion 31 presses the outer cable 62 in a radial direction, and the cap portion 30 reaches the fixing position. At this time, the engaging claw 23*b* of the claw portion 23 slips through the opening 32*a* of the claw receiving portion 32 and is engaged with the engaging portion 32*b* of the claw receiving portion 32. When the cap portion 30 reaches the fixing position, the cap portion 30 is held in a posture facing the cable fixing base 21, and the outer cable 62 is clamped between the cap portion 30 and the cable fixing base 21. Accordingly, the outer cable 62 is fixed to the cable holding portion 20 of the handle case 10.

As described above, in the present embodiment, the handle case 10 is formed of the integrally molded product obtained by integrally molding the cable fixing base 21 and the cap portion 30 via the connecting piece 41 in a posture in which the rotation shaft 37 and the plurality of bearing arms 27 face each other. In this case, the connecting piece 41 includes the breaking portion 41*a* that is broken when an external force is applied to the cap portion 30.

According to this configuration, by connecting the cable fixing base 21 with the cap portion 30 by the connecting piece 41, the handle case 10 can be easily obtained as the integrally molded product. Further, by applying an external force to the cap portion 30, the connecting piece 41 can be broken at the breaking portion 41*a*. Accordingly, the rotation shaft 37 can be engaged with the plurality of bearing arms 27, and the hinge portion 40 can be configured. As a result, it is possible to perform the rotation operation of the cap portion 30 for fixing each of the cable devices 60, 70. In this way, since the hinge portion 40 is made into an engagement structure, it is not necessary to design a complicated wall thickness, and a structure having excellent moldability can be obtained. Further, since the hinge structure is provided, the rotation operation of the cap portion 30 is easy, and the workability at the time of fixing the cable devices 60, 70 is excellent.

In the present embodiment, the breaking portion 41*a* is set at a connection portion of the connecting piece 41 that is connected to the rotation shaft 37. However, the breaking portion 41*a* may be set at any position of the connecting piece 41. However, when the breaking portion 41*a* is set at the connecting portion connected to the rotation shaft 37, burrs (residual pieces after breaking) hardly occur on the surface of the rotation shaft 37. Accordingly, it is possible to suppress a situation in which the rotation of the rotation shaft 37, that is, the rotation of the cap portion 30 is prevented.

Further, in the present embodiment, the connecting piece 41 is set to the central bearing arm 27 of the plurality of bearing arms 27, but may be set to any of the bearing arms 27. However, by setting the connecting piece 41 to the central bearing arm 27, the external force can be appropriately applied to the connecting piece 41, and the workability at the time of breaking is excellent. In addition, the connecting piece 41 may connect the first hinge piece 25 with the second hinge piece 35 in addition to the form of connecting the bearing arm 27 and the rotation shaft 37, or may connect the cable fixing base 21 and the cap portion 30.

In the present embodiment, by the pushing force that pushes the cap portion 30 toward the cable fixing base 21 side such that the rotation shaft 37 and the plurality of bearing arms 27 are engaged, after the breaking portion 41*a* is broken, the rotation shaft 37 is engaged with the plurality of bearing arms 27.

According to this configuration, the breaking of the breaking portion 41*a* and the engagement of the first hinge piece 25 and the second hinge piece 35 can be performed by the same operation that applies the pushing force to the cap portion 30. Accordingly the hinge portion 40 for rotating the cap portion 30 can be configured without complicated works.

In the present embodiment, the rotation shaft 37 and the bearing arms 27 include the protrusion portion 37*a* and a concave protrusion receiving portion 27*a* corresponding to the protrusion portion 37*a*. Here, the protrusion portion 37*a* and the protrusion receiving portion 27*a* are engaged with each other when the second hinge piece 35 is engaged with the first hinge piece 25 by the pushing force, and hold the posture of the cap portion 30 with respect to the cable fixing base 21.

According to this configuration, the rotation of the cap portion 30 can be restricted by the engagement force between the protrusion portion 37*a* and the protrusion receiving portion 27*a*. As a result, wobbling of the cap portion 30 is suppressed, so that handling of the handle case 10 becomes easy at the time of shipment or manufacture of the vehicle.

In the present embodiment, the protrusion receiving portion 27*a* is provided on the first hinge piece 25 (bearing arm 27) side, and the protrusion portion 37*a* is provided on the second hinge piece 35 (rotation shaft 37) side, but these relationships may be reversed.

In the present embodiment, the posture of the cap portion 30 is held in the open position, but the position where the posture of the cap portion 30 is held may be a position where the cap portion 30 is rotated by the predetermined angle from the open position to the fixing position. However, when the posture is held in the open position, the cap portion 30 and the cable fixing base 21 are disposed in a straight line. Thus, packaging at the time of shipment of the handle case 10 and the handling thereof in a vehicle manufacturing line become easy.

In the present embodiment, the protrusion portion 37*a* and the protrusion receiving portion 27*a* are disengaged by applying a rotating force around the hinge portion 40 to the cap portion 30. Here, the cap portion 30 is rotated to a fixing position at which each of the cable devices 60, 70 is clamped and fixed between the cap portion 30 and the cable fixing base 21 when the protrusion portion 37*a* and the protrusion receiving portion 27*a* are disengaged.

According to this configuration, it is possible to release the engagement between the protrusion portion 37*a* and the protrusion receiving portion 27*a* by the rotation operation of the cap portion 30 for fixing the cable devices 60, 70. Accordingly, the protrusion portion 37*a* and the protrusion receiving portion 27*a* can be disengaged from a series of rotation operations for fixing the cable devices 60, 70.

The vehicle handle device according to the present embodiment has been described above, but the present invention is not limited to the embodiment described above, and various modifications can be made within the scope of the present invention. The handle device applied to the side door has been described in the embodiment described above, but the present invention can be applied to various parts such as a back door as the vehicle handle device according to the present invention.

The handle device of the vehicle according to the present embodiment is not limited to the inside door handle device, and may be applied to an outside door handle device.

In the present embodiment, the handle case is formed of the integrally molded product obtained by integrally molding the cable fixing base and the cap portion via the connecting piece. The handle case may be configured by a component that is independent of the cable holding portion and the case body, and the cable holding portion forming a part of the handle case may be assembled to the case body forming a part of the handle case. In this case, the cable holding portion may be formed of the integrally molded product obtained by integrally molding the cable fixing base and the cap portion via the connecting piece.

Further, in the present embodiment, the "engaging piece" and the "engaged piece" refer to one part and the other part in an engagement relation, and are not intended to limit the shapes thereof according to these names. The "engaging piece" may be provided at the cap portion, the "engaged piece" may be provided at the cable fixing base, and the "engaging piece" may be provided at one of the cable fixing base and the cap portion, and the "engaged piece" may be provided at the other.

REFERENCE SIGNS LIST 1 inside door handle device
10 handle case
11 case body
20 cable holding portion
21 cable fixing base
22 protrusion
23 claw portion
23a pillar portion
23b engaging claw
25 first hinge piece
26 extension portion
27 bearing arm
27a protrusion receiving portion
30 cap portion
31 clamping portion
32 claw receiving portion
32a opening
32b engaging portion
35 second hinge piece
36 extension portion
37 rotation shaft
37a protrusion portion
40 hinge portion
41 connecting piece
41a breaking portion
45 handle
50 lock knob
60, 70 cable device (first cable device, second cable device)
61, 71 inner cable
62, 72 outer cable

The invention claimed is:

1. A vehicle handle device configured to operate a door lock device via a cable device, the vehicle handle device comprising:
an operation member connected to the cable device; and
a handle case housing the operation member,
wherein the handle case comprises:
a cable fixing base in which the cable device is arranged;
a cap portion configured to fix the cable device to the cable fixing base; and
a hinge portion configured to engage an engaging piece provided on one of the cable fixing base and the cap portion with an engaged piece provided in another of the cable fixing base and the cap portion, and rotatably connect the cap portion to the cable fixing base,
wherein the cable fixing base and the cap portion are integrally molded via a connecting piece, in the handle case,
wherein the engaged piece and the engaging piece are linearly laid out and face each other with the connecting piece therebetween,
wherein the connecting piece includes a breaking portion configured to be broken when an external force is applied to the cap portion; and
wherein the breaking portion is configured to be broken and the engaged piece and the engaging piece are configured to be engaged when a pushing force pushing the cap portion toward the cable fixing base side is applied to the cap portion in a constant direction along an arrangement direction of the cable fixing base and the cap portion, such that the engaged piece and the engaging piece are engaged.

2. The vehicle handle device according to claim 1,
wherein the engaged piece and the engaging piece comprise:
a protrusion portion provided on one of the engaged piece and the engaging piece and protruding outward; and
a protrusion receiving portion provided on another of the engaged piece and the engaging piece, corresponding to the protrusion portion, and being concave, and
wherein the protrusion portion and the protrusion receiving portion are configured to be engaged with each other in a state that the engaged piece is engaged with the engaging piece by the pushing force, and hold the posture of the cap portion with respect to the cable fixing base.

3. The vehicle handle device according to claim 2,
wherein the protrusion portion and the protrusion receiving portion are configured to be disengaged by applying a rotating force around the hinge portion to the cap portion, and
wherein the cap portion is configured to be rotated to a fixing position at which the cable device is clamped and fixed between the cap portion and the cable fixing base, when the protrusion portion and the protrusion receiving portion are disengaged.

4. The vehicle handle device according to claim 1,
wherein the connecting piece connects the engaged piece with the engaging piece.

* * * * *